P.E.L.W. Stockman.
Tent.
Nº 92,487. Patented Jul. 13, 1869.
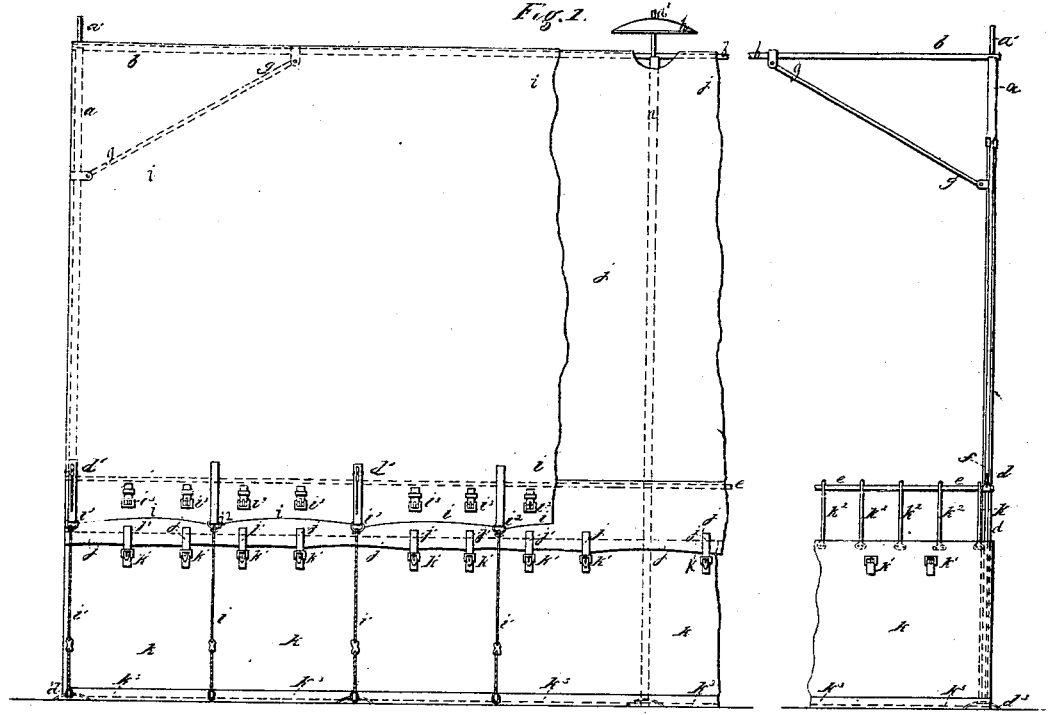
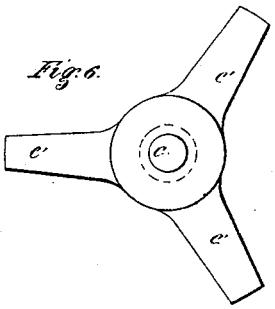
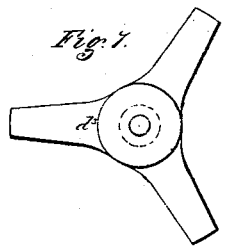
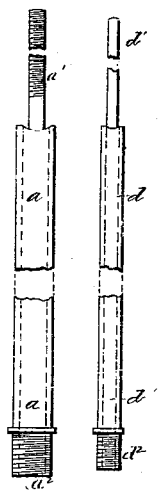
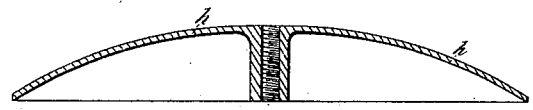
Witnesses
Fredk Harry
B. J.B. Mills.
Inventor
P.L. Stockman

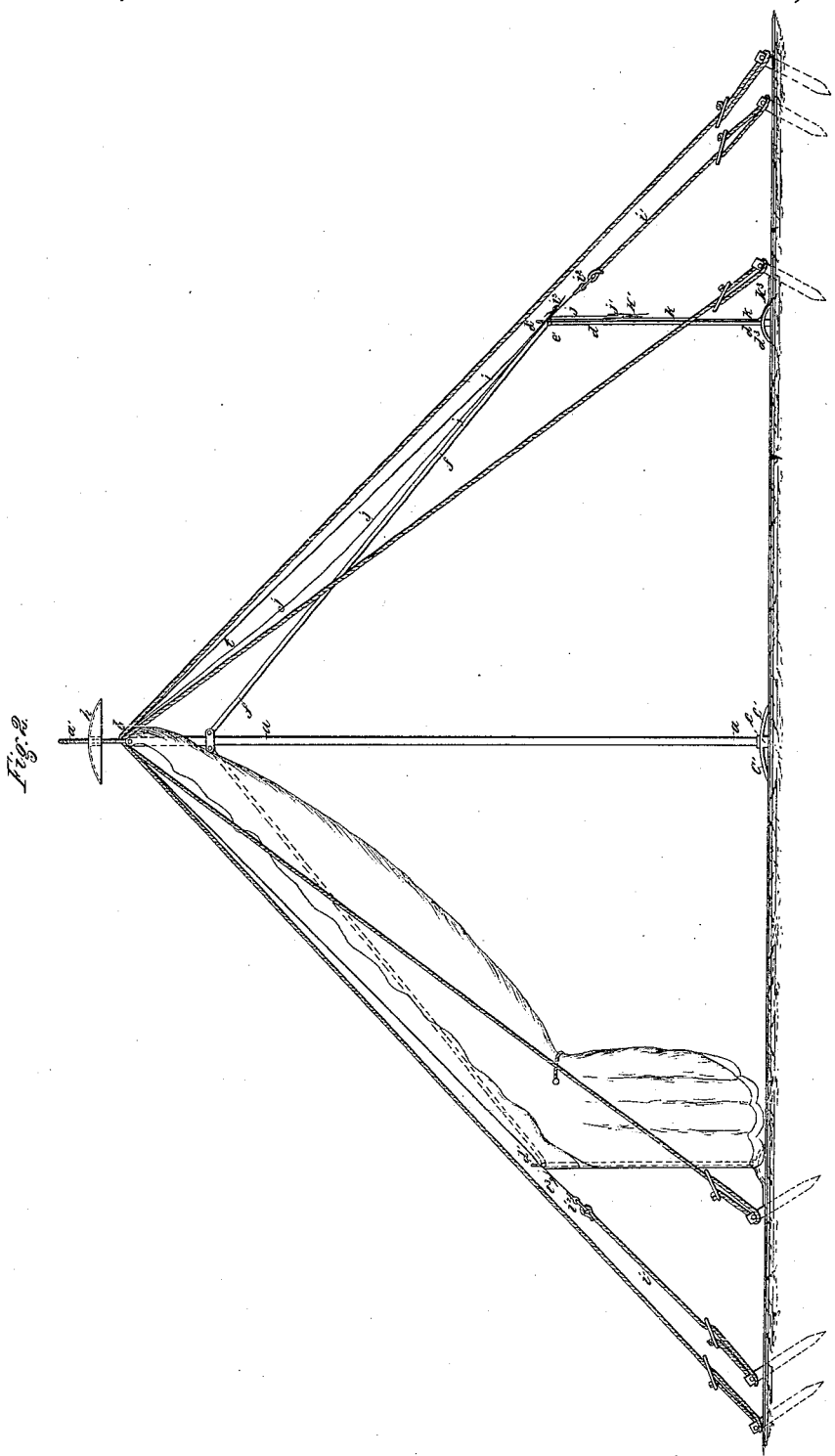

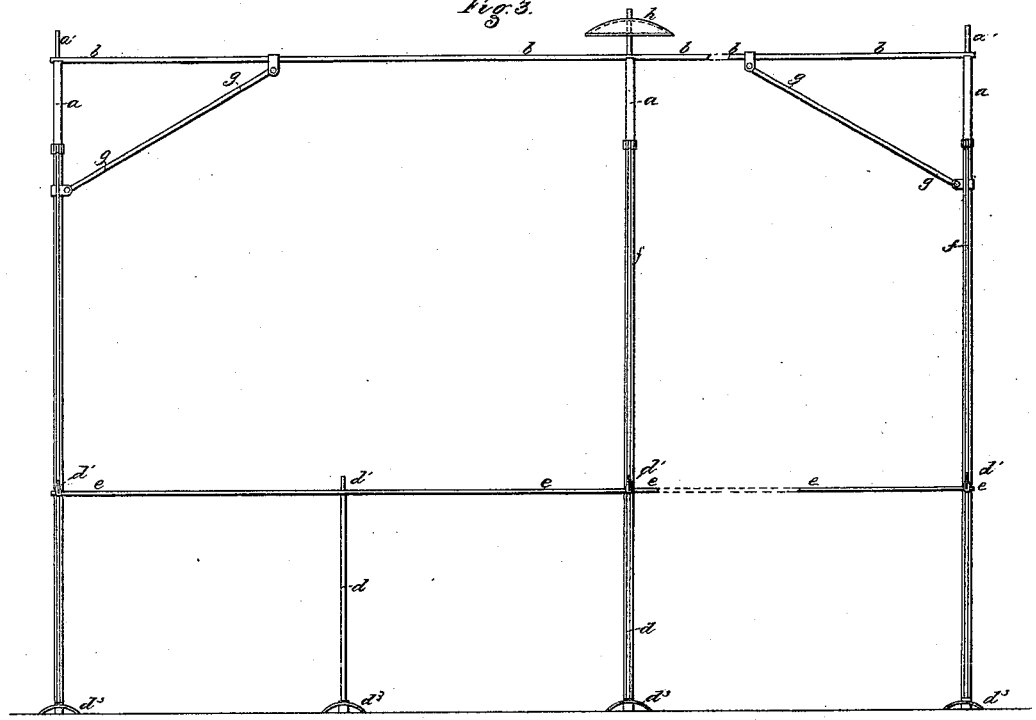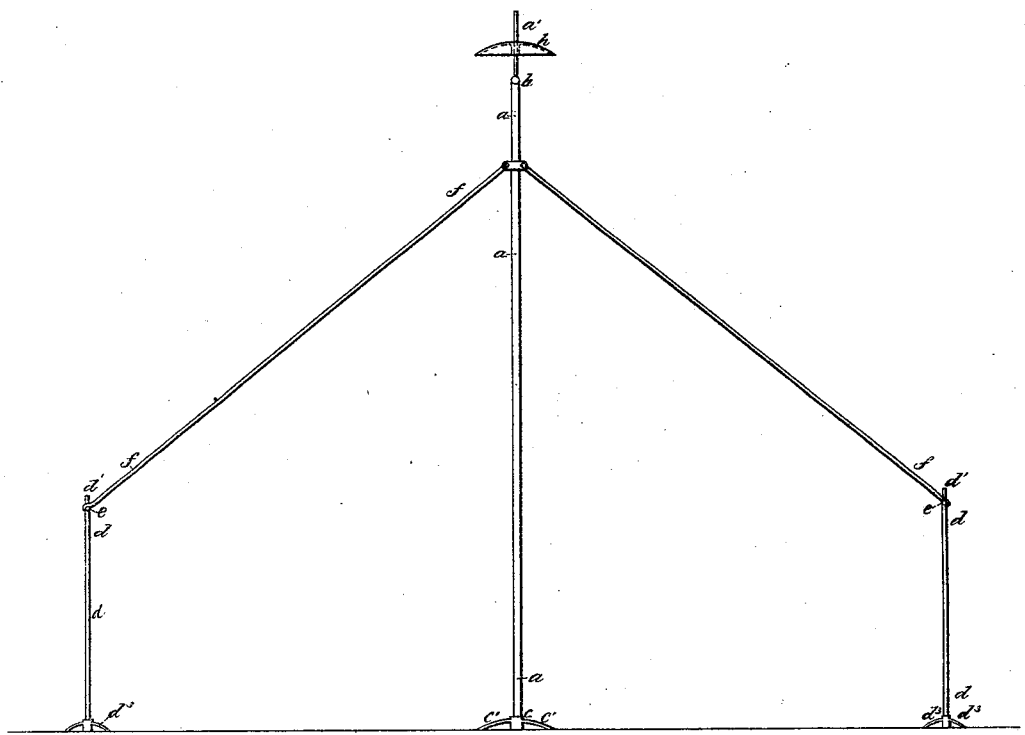

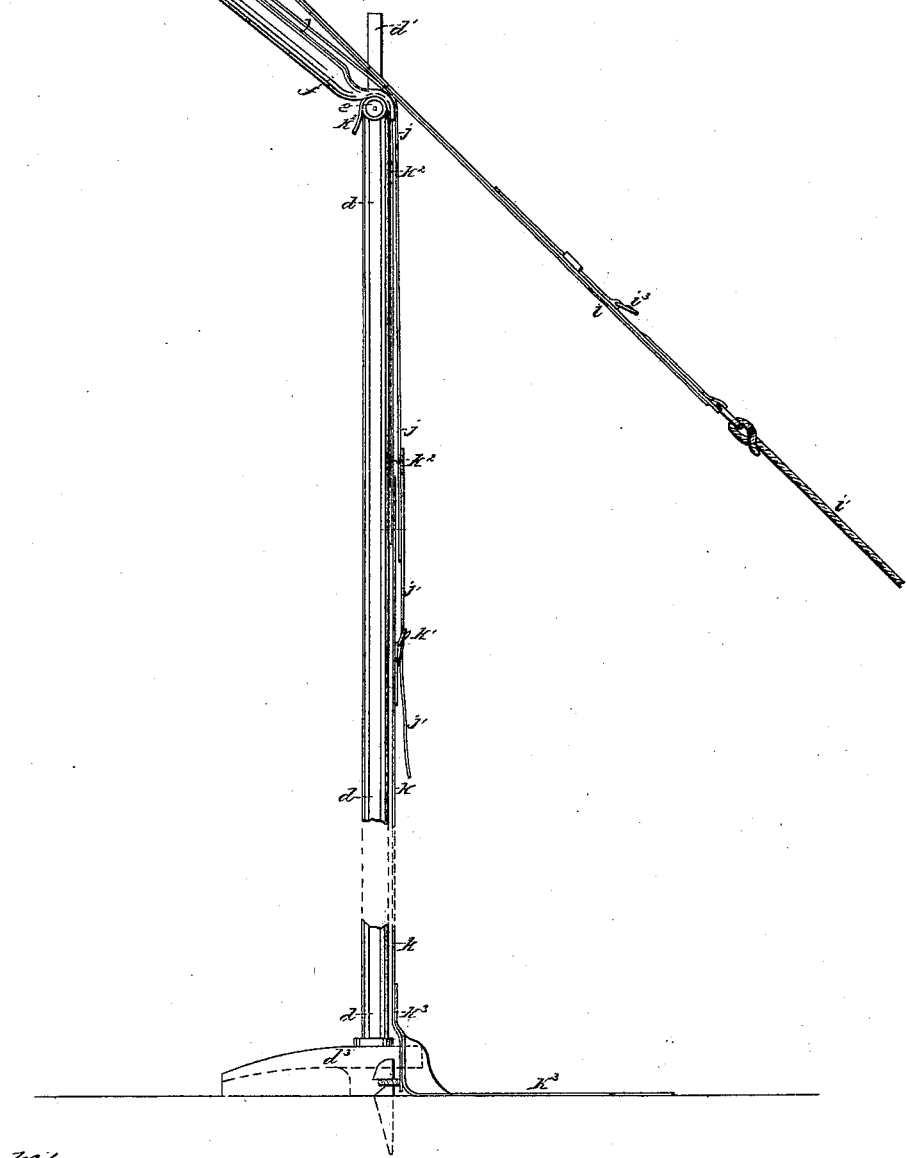

United States Patent Office.

PAUL EMIL LOUIS WILHELM STOCKMAN, OF KEPPEL STREET, RUSSEL SQUARE, ENGLAND.

Letters Patent No. 92,487, dated July 13, 1869; patented in England, September 21, 1868.

---

IMPROVEMENT IN TENTS.

---

The Schedule referred to in these Letters Patent and making part of the same.

---

*To all to whom it may concern:*

Be it known that I, PAUL EMIL LOUIS WILHELM STOCKMAN, of Keppel street, Russel Square, in the county of Middlesex, England, a subject of the King of Prussia, have invented or discovered new and useful "Improvements in Tents;" and I, the said PAUL EMIL LOUIS WILHELM STOCKMAN, do hereby declare the nature of the said invention, and in what manner the same is to be performed, to be particularly described and ascertained in and by the following statement thereof; that is to say—

The invention has for its object improvements in tents.

For this purpose, instead of employing the ordinary wood pole or poles to support the central portion of the tent, I employ in lieu thereof, by preference, hollow rods or tubes of metal.

Upon the lower ends of these rods or tubes, I form screws, which I screw into suitable sockets.

These sockets are formed on or connected to plates or flattened surfaces, having three or more arms or branches.

These arms or branches are suitably bent downward at their outward edges, to cause them to enter the ground to a slight extent, by means of which they are prevented from turning thereon.

At or near the upper parts of the central tubular supports, already described, arms or stretchers are pin-jointed, or otherwise connected.

These arms or stretchers are, by preference, hollow, and they serve to connect the central tubular supports with other tubular supports arranged on either side thereof, and when several of such side tubular supports are arranged side by side, they are connected to each other by connecting-pieces which extend from the one to the other, and these connecting-pieces I also, by preference, form tubular. By these means the central tubular supports are held firmly together.

The side supports are, at their lower ends, furnished with screws, to screw into sockets, in like manner to those described in respect to the central tubular supports.

The canvas, or other covering employed for the roof of the tent, is made double, both covers being passed over and made fast to the upper parts of the central supports; thence they pass downward over the connecting-pieces of the outer or side supports, the outer covering being stretched tight by guy-ropes connected thereto, whilst the under covering is allowed to hang down away from the outer one, so as to leave a space between them, and is connected to the side covers by straps and buckles, such side covers being supported by hooks on the side connecting-pieces, and being provided with a strip of water-proof material along its lower edge.

Suitable holes are left in the covers for the roof to act as ventilators, such holes being protected from the entrance of wet by suitable covers carried by the central supports.

The outer cover is provided with buckles, to permit of the under cover being connected thereto when ventilation is desired through the sides of the tent.

And in order that my invention may be more fully understood, and readily carried into effect, I will proceed, aided by the accompanying drawings, more fully to describe the same.

Description of the Drawings.

Figure 1 is a side view, and

Figure 2 is an end view of a tent constructed according to my invention;

Figure 3 is a side view, and

Figure 4 is an end view of the framing thereof, separately; and

Figures 5, 6, 7, 8, 9, and 10, are views of some of the parts to a larger scale.

$a\ a$ are hollow rods or tubes, having pins, $a^1\ a^1$, at their upper ends, to pass through holes formed for them in the hollow rod or tube $b$, forming the ridge of the tent, whilst their lower ends are provided with screw-threads, $a^2$, to screw into suitable sockets, $c$, having arms or branches, $c'$, connected thereto, which, at their outer edges, are bent into somewhat of a V-shape, or are otherwise suitably formed, in order to enable them slightly to enter the ground and get a firm grip thereof.

$d\ d$ are other hollow rods or tubes, similar to the tubes $a\ a$, having pins, $d^1\ d^1$, at their upper ends, to enter holes formed in the hollow rods or tubes $e\ e$, and screws, $d^2$, at their lower ends, to screw into sockets formed in feet $d^3\ d^3$, in a similar manner to that described with respect to the tubes $a\ a$.

The upright tubes $a\ a$ have pin-jointed, or otherwise connected thereto, near their upper ends, arms or stretchers, $f\ f$, which, at their outer ends, have holes formed therein, to pass over the pins $d^1\ d^1$, and are bent so as to fit around the tubes $e\ e$, upon which they rest.

Other arms, stays, or stretchers, $g\ g$, are pin-jointed, or otherwise connected at one end to the end uprights $a\ a$, and at their other ends are pin-jointed, or otherwise connected to the horizontal tube $b$.

The intermediate uprights $a\ a$ have screw-threads formed on their pins $a^1\ a^1$, to receive disks $h\ h$, and provide facility for raising and lowering such disks, as desired, there being suitable holes formed in the tent-cover immediately under such disks, to act as ventilators.

The covering, which may be of canvas, or any other suitable material, is made double, as shown in the drawing, the outer covering, $i$, being stretched by guy-ropes, $i^1$, passing through rings $i^2$, whilst the lower or under covering, $j$, is allowed to hang away from the outer covering $i$, as shown more clearly at fig. 5, and has connected, along its lower edge, a number of straps, $j'$, which may be connected to buckles, $k^1$, on the side covering $k$; or, when it is desired to obtain ventilation along the sides of the tent, the straps $j'$ are fastened to the buckles $i^3$, on the outer cover $i$, and thereby hold the under covering $j$ away from the side cover $k$, so as to leave a free passage for air through the space left between the top of the side covering $k$ and the longitudinal rods or bearers $e\ e$; the side covering $k$ being, for this purpose, suspended by hooks $k^2$ to the longitudinal tubes or rods $e\ e$.

Such side covering $k$ is provided with a strip of vulcanized India rubber, gutta-percha, or other suitable water-proof material, $k^3$, along its lower edge, to prevent its becoming wet by moisture rising from the earth, and such covering is secured along the bottom, on its inner side, by stakes driven into the ground.

The rods or tubes $b\ b$ and $e\ e$, I, by preference, form in one or more parts, according to the size and description of tent desired, and I connect them together in any suitable manner.

Suitable guy-ropes, cleats, and stakes are employed, as in other descriptions of tents, to hold the entire structure firm and secure against the action of the wind, as shown in the drawings.

I would remark, that although I have described and prefer the various parts to be tubular, yet, if desired, any or all of the parts may be made solid, and tents of any form and size may be constructed in a similar manner to that before described, as will be well understood.

By these means a tent may be quickly put up and taken down, while it is perfectly secure against the weather, and every facility is afforded for ventilation, when desired.

Having thus described the nature of my said invention, and the mode in which I prefer to carry the same into effect, I would have it understood that I do not confine myself to the precise details herein shown and described; but

What I do claim, is—

1. The tent-frame, composed of feet $c\ d^1$, uprights $a\ d$, longitudinal tubes or rods $b\ c$, and stretchers or braces $f\ g$, combined and arranged substantially as shown and described, for the purposes set forth.

2. The tent-covering, composed of the double roof $i\ j$, and separate sides $k\ k$, combined and arranged substantially as shown and described, for the purposes set forth.

3. The feet $c\ d^3$, constructed as shown and described, in combination with the posts or uprights $a\ d$ of a tent-frame, as and for the purpose set forth.

4. The side covers $k$, partially covering the vertical walls of the tent, and suspended by hooks $k^2\ k^2$, or their equivalent, substantially as herein shown and described.

5. The combined arrangement of the fastenings $k^1$, $i^3$, and $j'$, with the side coverings $k$, outer covering $i$, and under covering $j$, substantially as and for the purposes set forth.

PAUL STOCKMAN.

Witnesses:
FREDK. HARRIS,
  35 *Southampton Buildings.*
JAMES E. NAYLOR,
  71 *Cornhill, London, Notary's Clerk.*